United States Patent [19]

Nakamura et al.

[11] 4,131,594

[45] Dec. 26, 1978

[54] FIRE-RESISTANT THERMOPLASTIC POLYESTER RESIN COMPOSITIONS AND PROCESS FOR RENDERING POLYESTERS FIRE-RESISTANT

[75] Inventors: Yoshitsugu Nakamura; Takeo Kawamura; Noritsugu Saiki; Michiyuki Tokashiki, all of Iwakuni, Japan

[73] Assignee: Teijin Limited, Osaka, Japan

[21] Appl. No.: 579,064

[22] Filed: May 20, 1975

[30] Foreign Application Priority Data

May 25, 1974 [JP] Japan .................................. 49-58415
Jun. 3, 1974 [JP] Japan .................................. 49-61784

[51] Int. Cl.$^2$ ............................................. C08L 67/06
[52] U.S. Cl. ......................... 260/40 R; 260/45.75 B; 260/45.8 A; 260/45.95 R; 260/873; 260/42.18
[58] Field of Search ............. 260/40 R, 45.75 B, 873, 260/42.18, 45.8 A, 45.95

[56] References Cited

U.S. PATENT DOCUMENTS

| | | | |
|---|---|---|---|
| 3,564,077 | 2/1971 | Brinkmann et al. | 260/873 |
| 3,751,396 | 8/1973 | Gall | 260/40 R |
| 3,864,428 | 2/1975 | Nakamura et al. | 260/873 |
| 3,886,231 | 5/1975 | Nield | 260/873 |
| 3,919,353 | 11/1975 | Castelnuovo et al. | 260/873 |
| 3,953,394 | 4/1976 | Fox et al. | 260/860 |

*Primary Examiner*—J. Ziegler
*Attorney, Agent, or Firm*—Sherman & Shalloway

[57] ABSTRACT

A fire-resistant thermoplastic polyester resin composition having excellent anti-dripping properties which comprises
(A) an aromatic polyester resin,
(B) a graft copolymer of a butadiene polymer-vinyl monomer in an amount of at least 0.5 parts by weight but less than 25 parts by weight per 100 parts by weight of said polyester resin (A),
(C) a fire retardant in an amount of from 0.5 to 35 parts by weight per 100 parts by weight of said polyester resin (A).

8 Claims, No Drawings

FIRE-RESISTANT THERMOPLASTIC POLYESTER RESIN COMPOSITIONS AND PROCESS FOR RENDERING POLYESTERS FIRE-RESISTANT

DETAILED DESCRIPTION OF THE INVENTION

This invention relates to fire-resistant thermoplastic polyester resin compositions and a process for rendering polyesters fire-resistant, said compositions having remarkably improved fire-resistant properties and especially being capable of avoiding the occurrence of the so-called "drip" phenomenon in which a moulded article becomes thermoplasticized by a flame and falls in the form of drops.

Thermoplastic aromatic polyester resins are used as a molding material in a wide field utilizing their good properties such as chemical resistance or abrasion resistance. Such resins, however, suffer from the disadvantage that their utility has been seriously restricted by both their properties of burning in a relatively easy manner and "drip" phenomenon which easily occurs at the time of burning. Especially in the use of a molded article which is as thin as possible, the occurrence of the disadvantageous "drip" phenomenon becomes more remarkable. Such occurrence causes a combustible body to be burnt by the falling of resin melt drops onto the body. Accordingly, where satisfactory fire-resistant properties are imparted to polyester resins, such improvement is required as can essentially avoid the occurrence of the "drip" phenomenon.

Heretofore many suggestions have been made with a view to imparting fire-resistant properties to thermoplastic aromatic polyester resins. Yet, it has been difficult to render said resins fire-resistant without essentially sacrificing their desirable properties, enabling even the occurrence of the unfavorable "drip" phenomenon to be essentially avoided. For example, even if an attempt is made to impart fire-resistant properties to said polyester resin by blending it with a fire retardant, no satisfactory results can be obtained as shown in the Comparative Examples given below. Further, if an excessive amount of the fire retardant is blended in said polyester resin, the impact strength or the like, will be substantially sacrificed, as is naturally expected. Accordingly, the amount to be mixed will be naturally restricted. Further, some suggestions are known to improve the unfavorable "drip" phenomenon which occurs in a peculiarly marked manner in the thermoplastic aromatic polyester resin as compared with other thermoplastic resins. For instance, there are known the suggestion of blending polytetrafluoroethylene resins (see Japanese Laid-Open Appln. 42942/72), the suggestion of blending a fumy colloidal silica (Japanese Laid-Open Appln. 32949/73), the suggestion of blending asbestos (Japanese Laid-Open Appln. 11281/72), etc. Since there is a poor affinity of these additives for the polyester resin, however, the problem occurs that properties of the polyester resin will be naturally deteriorated by blending said additive in an amount useful to prevent the "drip" phenomenon.

Studies have been conducted in order to provide a process and a composition for rendering thermoplastic aromatic polyester resins fire-resistant, said process being able to avoid essentially the occurrence of the "drip" phenomenon which markedly occurs in said resin without sacrificing desired properties of said resin.

As a result, it has been found possible to provide a process and a composition for rendering said polyester resin fire-resistant, while having markedly improved fire-retardant properties without sacrificing desired properties of said resin, by blending both a fire retardant and a graft copolymer of a butadiene polymer-vinyl monomer, in as small amounts as possible. Such process enables avoidance of even the occurrence of the "drip" phenomenon and improves the impact strength. Further, it has been discovered that the burning, thought to be promoted by blending a glass fiber (e.g. U.S. Pat. No. 3,751,396), and occurrence of the "drip" phenomenon in the presence of the glass fiber, can be avoided by blending such glass fiber together with a fire retardant and a graft copolymer of a butadiene polymer-vinyl monomer. This has the merit of a reinforcing effect because of the glass fiber but not the above disadvantage.

Accordingly, it is an object of this invention to provide aromatic polyester resin compositions having improved fire-retardant properties with the prevention of the "drip" phenomenon involved and a process for imparting said properties to aromatic polyester resins.

According to this invention, it is possible to provide a process for imparting to an aromatic polyester resin remarkably improved fire-resistant properties which satisfy the standard of Underwriters Laboratories Subject 94 (UL 94) by co-use of a fire-retardant and a graft copolymer of a butadiene polymer-vinyl monomer in as small amounts as possible without sacrificing desirable properties in said resin and to produce aromatic polyester resins having said improved properties.

The fire-resistant thermoplastic resin composition consists essentially of:
(A) an aromatic polyester resin,
(B) a copolymer of a butadiene polymer-vinyl monomer in an amount of at least 0.5 part by weight but less than 25 parts by weight, preferably about 1 to about 20 parts by weight, more preferably about 2 to about 15 parts by weight per 100 parts by weight of said polyester resin (A),
(C) a fire retardant in an amount of from 0.5 to 35 parts by weight, preferably about 3 to about 30 parts by weight, more preferably about 5 to about 25 parts by weight per 100 parts by weight of said polyester resin (A),
(D) a glass fiber in an amount ranging from 0 to 120 parts by weight, preferably 0 to 100 parts by weight per 100 parts by weight of said polyester resin (A), and
(E) at least one additive selected from the group consisting of stabilizers, coloring agents, mold releasing agents, nucleating agents, lubricants, inorganic fillers other than glass fiber and blowing agents in an amount of from 0 to 10 parts by weight, preferably 0 to 5 parts by weight per 100 parts by weight of said polyester resin (A).

The aromatic polyester used for the composition of this invention is a polyester having chain units containing an optionally substituted aromatic ring in the main chain of the polymer. Examples of the substituent for the aromatic ring are halogen atoms such as chlorine or bromine, $C_1$–$C_4$ alkyl groups such as a methyl, ethyl or tert.-isobutyl. These aromatic polyesters can be obtained by reacting aromatic dicarboxylic acids or ester-forming derivatives thereof with glycols by known means.

The acid component may be selected from the group consisting of naphthalene-2,6-dicarboxylic acid and terephthalic acid which may have a substituent such as mentioned above and ester-forming derivatives thereof, such as lower alkyl esters. The glycols may be polymethylene glycols having 2 to 6 carbons atoms, especially 1,4-butanediol, 1,3-propanediol and 1,6-heptanediol. A part (preferably about not more than 30 mol%) of the acid component and/or glycol component may be replaced by other acids or ester-forming derivatives thereof. Examples of the other acid component are isophthalic acid, p-hydroxybenzoic acid, adipic acid, sebacic acid, naphthalene dicarboxylic acids other than the naphthalene-2,6-dicarboxylic acid, and ester-forming derivatives thereof. Examples of the other glycol component are 1,4-cyclohexanediol, bisphenol A and ester forming derivatives thereof.

Examples of the preferred aromatic polyester (A) are polyethylene terephthalate, polytrimethylene terephthalate, polytetramethylene terephthalate, polyhexamethylene terephthalate, polyethylene-2,6-naphthalate, polytetramethylene-2,6-naphthalate, and polyhexamethylene-2,6-naphthalate. These polymers can be used either alone or in combination. This invention is suitable for improvement of aromatic polyesters selected from the group consisting of polyethylene terephthalate, polytrimethylene terephthalate, polytetramethylene terephthalate, polyhexamethylene terephthalate and mixtures thereof, said aromatic polyester being very troublesome especially in fire-resistant properties.

The preferred butadiene polymer/vinyl monomer graft copolymer (B) used in the invention is a graft copolymer formed between a butadiene polymer whose butadiene units account for at least 50 mol% and a vinyl monomer. The preferred copolymer (B) used in the invention is one in which the butadiene polymer accounts for about 20 to 90% by weight, more preferably about 40 to 80% by weight, on the total basis of said copolymer (B).

Examples of such a vinyl monomer are methacrylic esters, aromatic monovinyl compounds, vinyl cyanide compounds, and mixtures of these. Specific examples include $C_1$-$C_4$ alkyl esters of methacrylic acid, preferably methyl methacrylate; aromatic monovinyl compounds such as styrene, vinyl toluene, $\alpha$-methylstyrene, nuclearly halogenated styrene or vinyl naphthalene, the styrene being especially preferred; and vinyl cyanide compounds such as acrylonitrile, methacrylonitrile, $\alpha$-halogenated acrylonitriles, the acrylonitrile being especially preferred. They can be used either alone or in admixture.

The graft copolymer is preferably one having $$\text{a grafting ratio (\%)} = \left[ \frac{\text{Weight of the acetone-insoluble portion}}{\text{Weight of the butadiene polymer in the graft copolymer } (B)} - 1 \right] \times 100$$

of about 15 to 200%, especially 30 to 120%.

The use of at least two of the monomers selected from methyl methacrylate, styrene and acrylonitrile is especially preferred for use as the vinyl monomer in the graft copolymer (B) in the present invention. For example, a combination of methyl methacrylate and styrene, and a combination of styrene and acrylonitrile. In the former combination, the preferred proportion of styrene is 10 to 60 mol%, especially 20 to 50 mol%, as against 90 to 40 mol%, especially 80 to 50 mol%, of methyl methacrylate. In the latter combination, the preferred proportion of acrylonitrile is 20 to 40 mol%, especially 30 ± 5 mol%, as against 80 to 60 mol%, especially 70 ± 5 mol%.

The preferred graft copolymer (B) used in the invention is one having an average particle diameter of less than about 50 $\mu$. The most preferred is one having an average particle diameter of less than about 10 $\mu$, especially ranging from above 1 $\mu$ to 1/100 $\mu$.

The graft copolymer (B) used in the present invention can be produced by any known means such as bulk polymerization, suspension polymerization, bulk-suspension polymerization, solution polymerization or emulsion polymerization. When it is desired to produce graft copolymer (B) having a major proportion of the butadiene polymer, the use of the emulsion polymerization technique is recommended. In the production of graft polymer (B), a homo- or co-polymer of the vinyl monomer may be formed in the reaction product. But the reaction product as such may be used as the graft co-polymer (B).

When the graft copolymer (B) is used as a mixture containing the above-mentioned vinyl homopolymer or copolymer, such as homo- or copolymer of the methacrylic esters, aromatic vinyl compounds, vinyl cyanide compounds, and the mixtures of these, the proportion of the vinyl homo-polymer or copolymer is desirably not more than 50% by weight based on the mixture.

The preferred aromatic polyester (A) has a reducing specific viscosity, as measured at 35° C. using a solution of 1.2g of polymer in 100 ml. of ortho-chlorophenol, of about 0.3 to about 2.5. The preferred graft copolymer (B) contains a trunk polymer portion in an amount of 20 to 90% by weight, preferably 40 to 80% by weight, of the graft copolymer (B).

When the graft copolymer (B) is employed in excessively small amounts deviating from the above quantity, the superior fire-resistant properties will be essentially lost.

On the other hand, if the amount of graft copolymer (B) is excessive, favorable properties of the aromatic polyester (A) such as chemical resistance or abrasion resistance become degraded and fire-resistant properties also worsen.

Suitable fire retardants (C) used in this invention are those capable of imparting fire-resistant properties, preferably self-extinguishing properties, when used in an amount of 0.5 to 35 parts by weight per 100 parts by weight of said polyester (A)

Examples of the especially preferred fire retardants (C) used in the invention include one selected from the group consisting of a compound of the formula

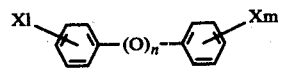

wherein
X represents a halogen atom, preferably a halogen atom selected from bromo and chloro,
n is an integer of 1 or 0, and
l and m each denote an integer of 1 to 5, a condensation product of halogenated bisphenol A with epichlorohydrin (halogen content of 20 wt% or above) a halogen-substituted or preferably chloro and/or bromo-substituted cyclopentadiene dimer, an oligomeric polycarbonate of tetrabromobisphenol A (preferably having an average polymerization degree of 1.5 to 10), and their combination with antimony oxide, red phosphorus and compounds of the formula

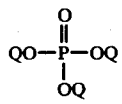

wherein Q represents a $C_1$-$C_3$ alkyl group or aryl group or bromine- or chlorine-substituted aryl group. Specific examples of the fire retardant (C) belonging to the especially preferred group may include decabromobiphenyl, decabromobiphenyl ether, hexabromobiphenyl ether of the formula

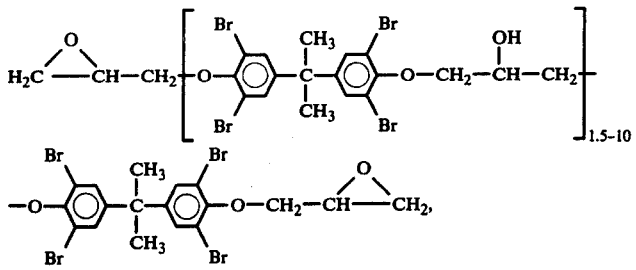

an oligomeric polycarbonate of tetrabromobisphenol A having an average polymerization degree of 2-6 and a combination of these with $Sb_2O_3$.

The instantly claimed composition may contain glass fiber (D) in amounts less than 120 parts by weight, preferably less than about 100 parts by weight, more preferably less than about 80 parts by weight per 100 parts by weight of said polyester (A).

Hitherto the blending of the glass fiber has been considered to accelerate the disadvantageous "drip" (burning) phenomenon of the thermoplastic aromatic polyester. However, it has been found that such disadvantage is not brought about by incorporating the glass fiber into the aromatic polyester composition of the invention in which the graft copolymer (B) and fire retardant (C) were blended in the specified quantitative range.

The composition of this invention may be in various forms such as powder, granule, flake, pellet or other forms of molding material, or various forms of melt-shaped articles such as extrusion molded articles or injection molded articles. The composition may further contain various additives such as stabilizers, coloring agents including a fluorescent bleaching agent, mold releasing agent, nucleating agents, lubricants, inorganic fillers other than glass fiber or blowing agent.

The stabilizer may, for example, be an oxidation stabilizer, light stabilizer, or heat stabilizer. Specific examples of the light stabilizer are benzotriazole compounds such as 2-hydroxy-5-methylbenzotriazole or 2-hydroxyl-3-chlor-5-t-butylbenzotriazole, benzophenone compounds such as 2,4-dihydroxybenzophenone, and phenyl salicylate-type compounds such as phenyl salicylate. Examples of the oxidation stabilizer include hindered phenol compounds such as stearyl 3,5-di-t.-butyl-4-hydroxyphenyl propionate, and amine compounds such as N,N'-di-β-naphthyl-para-phenylene diamine. Examples of the heat stabilizer include sulfur compounds such as dilauryl thioploydipropionate, and phosphorus compounds such as phosphoric acid, phosphorus acid, phosphinic acid, phosphonic acid, or esters of these. The coloring agent may be any desired dye or pigment.

Examples of the mold releasing agent include silicone. Examples of the lubricant are barium stearate, calcium stearate, or fluid paraffin. The nucleating agent may, for example, by an inorganic nucleating agent such as talc, an organic nucleating agent such as benzophenone, or a salt such as sodium terephthalate.

The filler other than glass fiber includes, for example, carbon fibers, asbestos, rock wool, powders or carbon, clay, silica, etc. The incorporation of these fillers is preferred because they give improvement in the mechanical characteristics, resistance to thermal deformation and fire retardancy of the composition of this invention.

Preferably, the amounts of these additives are up to 10 parts by weight based on 100 parts by weight of the polyester resin (A). For example, not more than 10 parts by weight, more preferably not more than 5 parts by weight of the stabilizer; 0.05 to 10 parts by weight, preferably up to 5 parts by weight of the mold releasing agent; 0.01 to 10 parts by weight, preferably up to 5 parts by weight of the nucleating agent; 0.01 to 10 parts by weight, preferably up to 5 parts by weight of the lubricant; 1 to 10 parts by weight of the filler. The amount of the coloring agent is usually 0.01 to 10 parts by weight, preferably up to 5 parts.

The degree of self-distinguishing properties of the instantly claimed fire-resistant thermoplastic resin composition is shown in that a leaf having a thickness of ⅛ inch or more possesses non-drip properties and a degree of fire resistance of 94 V-1 or higher as determined according to the method set forth in the revised edition of UL-94 issued on June 10, 1974. Preferably a 1/16 inch or 1/32 inch leaf has non-drip properties and a degree of fire resistance of 94 V-1 or higher.

The composition of the invention may be produced in accordance with various methods. According to one of these methods, a shaped pellet is formed by mixing a polyester resin (A), a graft copolymer (B), a fire retardant (C) and a glass fiber (D) as required and an additive (E) in proper proportions and putting the resulting mixture into an extrusion mixer. Further, there is also a method according to which a shaped pellet is formed beforehand by using at least one of the components (A) and (B) or at least one of the components (C), (D) and (E) with the former component, followed by mixing with the remaining components. It also is possible to mold a mixture of (A), (B), (C), (D) and (E) in adequate proportions into a pellet directly in accordance with the injection molding method or transfer molding method. It is preferred to dehydrate each component, resin and fire-resistant additives as much as possible at the time of molding. Further, it is preferred, at the time of mixing, to shorten the retention time in the machine, control temperatures carefully, and utilize a frictional heat, in order to ensure intimate mixing of the resin with the additive.

The composition can be shaped into a thermoplastic composition by means of conventional apparatus under general conditions. For example, when using poly(1,4-butylene terephthalate), good results may be obtained by the injection molding done at an ordinary cylinder temperature (e.g. 240° C.) and usual mold temperature (e.g. 60° C.). Further, in the case of polybutylene-2,6-naphthalate good results may be also obtained at a cylinder temperature of 250° C. and a mold temperature of 60° C. On the other hand, when using poly (ethylene terephthalate), the molding can be done by adding a crystallization accelerator (e.g. graphite or a metallic oxide such as ZnO or MgO) at standard mold temperature of 60° to, 80° C. because of the deficiency in evenness of the crystallization in the direction of from the inside toward to the outside of the thick piece. Although somewhat differing from the usual method, the molding is done at a mold temperature of at least 140° C. without using such nucleating agent. In addition, it is possible to use the composition of the invention by blending the same with the above polybutylene terephthalate or polybutylene-2,6-naphthalate at a mold temperature of 60° to 80° C. In the case of blending the glass fiber (D), a glass roving (an assembly of stands of filaments) is cut, for example, to 0.3-1.2 cm and is put into an extrusion mixer together with the polyester resin (A) and the fire retardant, thereby to form a shaped pellet. The fiber is shortened during this treatment and dispersed again to have a length of less than 0.2 cm. In accordance with other methods, the glass filament is pulverized and made short, followed by dry mixing with the polyester resin (A), the fire retardant (C) and the graft copolymer (B). Then, the resulting mixture is comminuted and kneaded or extruded for shredding purpose. Additionally in the other methods, continuous lengths of the glass roving is drawn into a bath consisting of the molten polyester resin (A), the fire retardant (C) and the graft copolymer (B) to coat a filament. Then the glass strand coated with a resin is moulded by cutting it into a small tube, for example, a 0.3 to 0.5 cm long tube. The glass fiber is mixed with the resin and the additive, and the resulting mixture can be shaped directly in accordance with the injection moding or transfer molding method.

The following Examples illustrate the present invention is greater detail. All parts and percentages in the Examples are on the weight basis.

The various properties of the compositions obtained were measured in accordance with the following methods.

Tensile Strength

ASTM D-638

Bending Strength ASTM D-790

Bending Modulus

ASTM D-790

Heat Distortion Temperature

ASTM D-648
The method mentioned in Underwriters Laboratories Subject 94 (the revised edition issued on June 10, 1974)

In the Examples, the following abbreviations will be used.

| Abbreviations | Standing for |
| --- | --- |
| $C_2T$ | Polyethylene terephthalate |
| $C_3T$ | Polytrimethylene terephthalate |
| $C_4T$ | Polytetramethylene terephthalate |
| $C_6T$ | Polyhexamethylene terephthalate |
| $C_4N$ | Polytetramethylene-2,6-naphthalate |
| St | Styrene |
| MMA | Methyl methacrylate |
| DBBO | Decabromobiphenyl ether |
| DBB | Decabromobiphenyl |
| TBA-PC | Oligomeric polycarbonate of tetrabromobisphenol A (having an average polymerization degree of about 4.5) |
| Br-EPO | (n: an average polymeriztion degree of about 2.5) |

EXAMPLE 1(A)

Preparation of graft copolymers: Sixty parts of a polybutadiene latex (solid content), 1 part of disproportionated potassium rosinate, 200 parts of water (including water contained in the latex), 0.005 part of ferrous sulfate, 0.01 part of disodium ethylenediaminetetraacetate and 0.19 part of formaldehyde sodium sulfoxylate were put into a polymerization vessel. Then, the vessel was heated to 60° C., followed by dropping a monomer mixture liquid consisting of methacrylic acid methylester (MMA) and styrene (St) having the weight proportion (MMA/St) described in Table 1, and 0.2 part of cumene hydroperoxide, under agitation for 2 hours. The agitation was continued for an additional 2 hours, and the polymerization was substantially completed. To the latex after polymerization, was added 0.5 PHR of hindered phenol and it was coagulated in an aqueous aluminum sulfate solution in accordance with the customary method, followed by filtration, washing and drying, to yield a white powder (average particle diameter of 0.2 μ) of a graft copolymer having graft degrees of 35%, 37%, 43%, and 47%.

EXAMPLE 1-(B)

Preparation of graft copolymers: Sixty parts of a styrene-butadiene copolymer latex (solid content), 1.0 parts of disproportionated potassium rosinate, 200 parts of water (including water contained in the latex), 0.005 part of ferrous sulfate, 0.01 part of disodium ethylenediaminetetraacetate and 0.19 part of formaldehyde sodium sulfoxylate were put in a polymerization vessel.

Then, the vessel was heated to 60° C., followed by dropping a monomer mixture liquid consisting of 26.0 parts of methacrylic acid methyl ester, 14.0 parts of styrene and 0.2 part of cumene hydroperoxide under agitation for 25 hours. The agitation was continued for an additional 2 hours, and the polymerization was almost completed. To the polymerized latex was added 1.0 PHR of hindered phenol and it was coagulated in an aqueous aluminium sulfate solution in accordance with the conventional method, followed by filtration, washing and drying to yield a white powder (average particle diameter of 0.05 $\mu$) of graft copolymer having a graft degree of about 57%.

EXAMPLES 2-6, 10-13 AND COMPARATIVE EXAMPLES 1-4

With a polyester (100 parts) resulting from a carboxylic acid component and glycol component as shown in Table 1 were mixed decabromobiphenyl ether, antimonyl trioxide and a butadiene type graft copolymer in the proportions shown in the Table 1 after which it was granulated by means of an extruder. Then, using an injection molding machine there were formed mold pieces having a length of 5 inches, a width of ½ inch and as of ⅛ inch and 1/16 inch. The degree of fire-resistance was determined using these pieces according to the method prescribed in Underwriters laboratories Subject 94 (UL 94). According to this method, a test piece is supporated vertically and is ignited for 10 seconds by putting it in the half of a ¾ inch flame of a burner from the bottom. Then the burner is removed, and when the fire goes out, the test piece is ignited again for 10 seconds. During such operation it is noted whether the drip occurs and whether an absorbent wadding situated 12 inches immediately below the test piece catches fire by means of the drip, and the burning time after removal of the burner is determined. The results obtained are shown in Table 1. Further, there are shown the results (Comparative Examples) obtained where no fire retardant is added, where no graft copolymer is added and where the fire retardant is concurrently used with an extremely large amount of graft copolymer.

In Table 1 the evaluation symbols given below have the following meanings defined on the basis of UL 94.

94V-0: Means that each group of five test pieces is brought into contact with the flame (of a gas burner) and the time required until flaming is within 10 seconds in each case and moreover, the wadding situated 12 inches below the test piece is not ignited by dripping.

94V-1: Means that each group of five test pieces is brought into contact with the flame (of a gas burner) and the time required until flaming is within 30 seconds in each case and moreover, the wadding situated 12 inches below the test piece is not ignited by dripping.

94V-2: Means that by following the procedure of 94V-1 the time required until flaming is within 30 seconds but the wadding is ignited by dripping.

94 HB: ⅛inch long test piece (the burning rate is 1.5 inch/min); 1/6 inch and 1/32 inch test pieces (the burning rate is 2.5 inch/min)

In the Table, the number of seconds means an average second required until five pieces flame; the term "the drip observed" denotes a case where the wadding situated 12 inches below the test piece is ignited by dripping, while the term "the drip not observed" denotes a case where no drip is observed or where the wadding is not ignited even if the drip occurs.

EXAMPLES 7-9

⅛inch and 1/16 inch molded pieces where obtained by following the procedure of Example 2 except that the graft rubber obtained in Example 1-(B) and the kind of fire retardants were changed. Also, polytetramethylene terephthalate (the reduction specific viscosity o 1.65) was used as the resin. The molded piece was subjected to the burning test as in Example 2. The results obtained are shown in Table 1.

EXAMPLES 14-20 AND COMPARATIVE EXAMPLES 5-8

With the polyester (100 parts) shown in Table 1 were mixed various fire retardants, antimony trioxide, glass fiber and a butadiene type graft copolymer (Ex. 17-21) obtained by the method of Example 1-A or a butadiene type graft copolymer (Ex. 14-16) obtained by the method of Example 1-B and granulated simultaneously by means of an extruder. Successively, the resulting granulates were processed into test pieces each having a length of 5 inches (127 mm), a width of 0.5 inch (1.27 mm) and a thickness of 1/16 inch (1.6 mm) by means of an injection molding machine. Further, each test piece was shaped to have a thickness of 1/32 inch (0.8 mm) by means of a miller.

Shown in Table 1 are the results obtained by measuring the presence of the drip and the burning time after removal of the burner (UL 94).

Further, there are shown the results obtained where no glass fiber is used (Comparative 6), where no graft polymer is added (Comparative 5) and where no fire retardant is used (Comparative 7 and 8). In each case, dripping occurred.

The properties of the sample in Example 12 are shown below.

|  | Tensile strength | Bending strength | Bending modulus | Heat distortion temperature |
|---|---|---|---|---|
| Example 12 | 1130 Kg/cm$^2$ | 1520 Kg/cm$^2$ | 73200 Kg/cm$^2$ | 206° C |

Table 1-(1)

| | Polyester | | | Fire retardant | | | Graft copolymer | | | |
|---|---|---|---|---|---|---|---|---|---|---|
| | Kind | Reduced specific viscosity | Glass fiber (parts) | Kind | Parts | Sb$_2$O$_3$ parts | MMA/st ratio | Graft degree (%) | Reduced* specific viscosity | Parts |
| Example 2 | C$_4$T | 1.65 | — | DBBO | 15 | 5 | 60/40 | 43 | 0.36 | 3 |
| 3 | " | " | — | " | 14 | 7 | " | " | " | 1 |
| 4 | " | " | — | " | 18 | 9 | " | " | " | 10 |
| 5 | " | " | — | " | 21 | 7 | " | " | " | 15 |
| 6 | C$_2$T | 0.72 | — | " | 12 | 5 | " | " | " | 5 |
| Comparative Example 1 | C$_4$T | 1.65 | — | DBBO | 15 | 5 | — | — | — | — |

Table 1-(1)-continued

| | Kind | Reduced specific viscosity | | Fire retardant | Parts | 2nd | MMA/st ratio | Graft degree (%) | Reduced specific viscosity | Parts |
|---|---|---|---|---|---|---|---|---|---|---|
| 2 | C₂T | 0.72 | — | " | 25 | 10 | 60/40 | 43 | 0.36 | 30 |
| 3 | " | " | — | " | 12 | 5 | — | — | — | — |
| 4 | C₄T | 1.65 | — | — | — | — | 60/40 | 43 | 0.36 | 25 |
| Example 7 | C₄T | 1.65 | — | DBB | 9 | 16 | 65/35 | 57 | 0.33 | 7 |
| 8 | " | " | — | TBA-PC | 12 | 8 | " | " | " | 5 |
| 9 | " | " | — | Cl-PCD | 15 | 5 | " | " | " | 3 |
| 10 | C₆T | 1.43 | — | DBBO | 18 | 6 | 60/40 | 43 | " | 4 |
| 11 | C₃T | 1.63 | — | Br-EPO | 21 | 7 | " | " | " | 5 |
| 12 | C₃T | 1.15 | 59 | DBBO | 24 | 8 | " | " | 0.36 | 6 |
| 13 | C₂T | 0.72 | 57 | " | 19 | 9 | " | " | " | 4 |
| Comparative Example 5 | C₄T | 1.15 | 56 | DBBO | 22 | 7 | — | — | — | — |
| 6 | " | " | — | " | 17 | 6 | 60/40 | 43 | 0.36 | 4 |
| Example 14 | C₄T | 1.15 | 7 | DBB | 10 | 23 | 65/35 | 57 | 0.33 | 4 |
| 15 | " | " | 49 | TBA-PC | 20 | 18 | " | " | " | 10 |

| | UL test (1/32 inch) | | | | UL test (1/16 inch) | | | | UL test (1/8 inch) | | | |
|---|---|---|---|---|---|---|---|---|---|---|---|---|
| | 1st (sec) | 2nd (sec) | Drip | Evaluation | 1st (sec) | 2nd (sec) | Drip | Evaluation | 1st (sec) | 2nd (sec) | Drip | Evaluation |
| Example 2 | | | | | 1 | 1 | Not observed | 94V-o | 0.3 | 0.3 | Not observed | 94V-o |
| 3 | | | | | 0.3 | 0.3 | Not observed | " | " | " | " | " |
| 4 | | | | | 3 | 1 | " | " | " | " | " | " |
| 5 | | | | | 7 | 5 | " | 94V-1 | 1 | 0.5 | " | " |
| 6 | | | | | 2 | 2 | " | 94V-0 | 0.3 | 0.3 | " | " |
| Comparative Example 1 | | | | | 0.3 | — | observed | 94V-0 | 0.3 | — | observed | 94V-0 |
| 2 | | | | | 30< | — | Not observed | 94HB | 30< | — | not observed | 94HB-0 |
| 3 | | | | | 0.3 | — | observed ignition | 94V-2 | 0.5 | — | observed ignition | 94V-2 |
| 4 | | | | | 30< | — | " | 94HB below | 30< | — | " | 94HB below |
| Example 7 | | | | | 7 | 6 | not observed | 94V-1 | 0.3 | 0.5 | not observed | 94V-0 |
| 8 | | | | | 4 | 3 | " | 94V-0 | " | " | " | " |
| 9 | | | | | 0.5 | 3 | " | " | " | " | " | " |
| 10 | | | | | 0.8 | 0.5 | " | " | " | " | 0.3 | " | " |
| 11 | | | | | 1 | 1 | " | " | " | " | " | " |
| 12 | 3 | 0.3 | Not observed | 94V-0 | | | | | | | | |
| 13 | 1 | 1 | " | " | | | | | | | | |
| Comparative Example 5 | 0.3 | — | Observed | 94V-0 | | | | | | | | |
| 6 | 2 | — | Observed ignition | 94V-2 | | | | | | | | |

| | Polyester | | Glass fiber (parts) | Fire retardant | | Sb₂O₃ parts | Graft copolymer | | | |
|---|---|---|---|---|---|---|---|---|---|---|
| | Kind | Reduced specific viscosity | | Kind | Parts | | MMA/st ratio | Graft degree (%) | Reduced specific viscosity | Parts |
| Example 16 | C₄T | 1.15 | 71 | Cl-PCD | 20 | 10 | 65/35 | 57 | 0.33 | 2 |
| 17 | C₃T | 1.38 | 60 | Br-EPO | 24 | 8 | 30/70 | 37 | 0.36 | 8 |
| 18 | " | " | " | " | " | " | 40/60 | 35 | 0.46 | " |
| 19 | " | " | " | " | " | " | 60/40 | 43 | 0.36 | " |
| 20 | " | " | " | " | " | " | 80/20 | 47 | 0.29 | " |
| Comparative Example 7 | C₃T | 1.38 | 60 | — | — | — | 60/40 | 43 | 0.36 | 8 |
| 8 | C₄T | 1.65 | — | — | — | — | 65/35 | 57 | 0.33 | 7 |

| | UL test (1/32 inch) | | | | UL test (1/16 inch) | | | | UL test (⅛ inch) | | | |
|---|---|---|---|---|---|---|---|---|---|---|---|---|
| | 1st (sec) | 2nd (sec) | Drip | Evaluation | 1st (sec) | 2nd (sec) | Drip | Evaluation | 1st (sec) | 2nd (sec) | Drip | Evaluation |
| Example 14 | 2 | 2 | Not observed | 94V-0 | | | | | | | | |
| 15 | 0.3 | 0.3 | " | " | | | | | | | | |
| 16 | 4 | 3 | " | " | | | | | | | | |
| 17 | 3 | 10 | " | 94V-1 | | | | | | | | |
| 18 | 2 | 4 | " | 94V-0 | | | | | | | | |
| 19 | 1 | 3 | " | " | | | | | | | | |
| 20 | 0.5 | 1 | " | " | | | | | | | | |
| Comparative Example 7 | 30< | — | Observed (ignition) | 94HB below | | | | | | | | |

Table 1-(1)-continued

| 8 | " | — | " | " |

*denotes a value obtained when dimethylformamide (DMF) is used as a solvent and 1g of a graft copolymer is dissolved in 100 cc of DMF and the resulting solution is measured at 25° C.

What we claim is:

1. A fire-resistant thermoplastic polyester resin composition which consists essentially of
   (A) an aromatic polyester resin selected from the group consisting of polyethylene terephthalate, polytrimethylene terephthalate, polytetramethylene terephthalate, polyhexamethylene terephthalate and mixtures thereof.
   (B) a graft copolymer derived from a butadiene polymer having at least 50 mol% of butadiene units and a graft monomer selected from the group consisting of methacrylic acid esters, aromatic monovinyl compounds, vinyl cyanide compounds, and mixtures thereof present in an amount of at least 0.5 parts by weight but less than 25 parts by weight per 100 parts by weight of said polyester resin (A),
   (C) a fire retardant selected from the group consisting of a compound of the formula

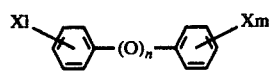

in which
X represents a halogen atom,
n respresents an integer of 1 or 0, and
l and m each represents an integer of 1-5, a halogen-substituted cyclopentadiene dimer; an oligomeric polycarbonate of tetrabromobisphenol A, and a combination thereof with antimony oxide, in an amount of from 0.5 to 35 parts by weight per 100 parts by weight of said polyester resin (A),
   (D) a glass fiber present in an amount less than 120 parts by weight per 100 parts by weight of said polyester resin (A), and
   (E) at least one additive, in an amount of 0 to 10 parts by weight per 100 parts by weight of said polyester resin (A), selected from the group consisting of stabilizers, coloring agents, mold releasing agents, nucleating agents, lubricants, and inorganic fillers other than said glass fiber.

2. The fire-resistant thermoplastic polyester resin composition of claim 1 wherein said composition is in the form of an injection molded article.

3. The composition of claim 1 wherein the graft copolymer is present in from about 1 to about 20 parts by weight, the fire retardant is present in from about 3 to about 30 parts by weight, and the glass fiber is present in less than about 100 parts by weight, all per hundred parts by weight of polyester resin.

4. The composition of claim 1 wherein the graft copolymer is present in from about 2 to about 15 parts by weight, the fire retardant is present in from about 5 to about 25 parts by weight, and the glass fiber is present in less than about 80 parts by weight, all per hundred parts by weight of polyester resin.

5. The composition of claim 3 wherein the graft copolymer has a grafting ratio of about 15 to 200 percent, and an average particle diameter of less than about 50 microns.

6. The composition of claim 4 wherein the graft copolymer has a grafting ratio of 30 to 120 percent, and an average particle diameter of less than 10 microns.

7. The composition of claim 3 wherein the fire retardant is selected from the group consisting of decabromobiphenyl, decabromobiphenyl ether, hexabromobiphenyl ether of the formula

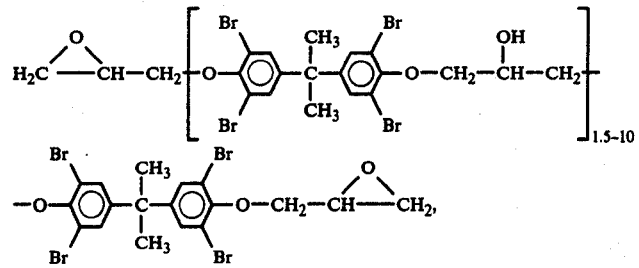

an oligomeric polycarbonate of tetrabromobisphenol A having an average polymerization degree of 2-6 and a combination of these with $Sb_2O_3$.

8. A process for imparting fire-resistant properties to an aromatic polyester resin according to which fire-resistant properties of said resin are improved by blending with a fire retardant which consists essentially of blending with an aromatic polyester resin (A), (B) a graft copolymer of a butadiene polymer-vinyl monomer in an amount of at least 0.5 parts by weight but less than 25 parts by weight per 100 parts by weight of said aromatic polyester resin (A); (C) a fire retardant in an amount of 0.5 to 35 parts by weight per 100 parts by weight of said polyester (A); and (D) a glass fiber present in an amount less than 120 parts by weight per 100 parts by weight of said polyester (A).

* * * * *